United States Patent
Yuyama

(10) Patent No.: US 7,141,774 B2
(45) Date of Patent: Nov. 28, 2006

(54) METHOD FOR SETTING INDIVIDUAL INFORMATION OF SOLID-STATE IMAGE SENSOR, SOLID-STATE IMAGE SENSOR, AND IMAGING DEVICE

(75) Inventor: Masami Yuyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 228 days.

(21) Appl. No.: 10/873,957

(22) Filed: Jun. 21, 2004

(65) Prior Publication Data

US 2004/0262495 A1   Dec. 30, 2004

(30) Foreign Application Priority Data

Jun. 27, 2003   (JP)   ............... 2003-183674

(51) Int. Cl.
*H01L 27/00*   (2006.01)
*H04N 5/225*   (2006.01)

(52) U.S. Cl. ............... 250/208.1; 348/374; 348/86
(58) Field of Classification Search ............ 250/208.1; 348/61, 86, 87, 374
See application file for complete search history.

(56) References Cited

U.S. PATENT DOCUMENTS 6,791,619 B1 * 9/2004 Misawa ............... 348/374

FOREIGN PATENT DOCUMENTS

JP   2003-046871 A   2/2003

* cited by examiner

*Primary Examiner*—Kevin Pyo
(74) *Attorney, Agent, or Firm*—Frishauf, Holtz, Goodman & Chick, P.C.

(57) ABSTRACT

A data region is provided to a non-effective pixel region, which is not used in generating an image, that constitutes a photosensitive surface of a solid-state image sensor. On a micro lens in predetermined pixels of the data region, a black film is selectively formed. Pixels having the black film are recognized as "0", and other pixels are recognized as "1". Individual information of the image sensor is stored in the data region, as digital information. The image sensor outputs an imaging signal including the individual information under a predetermined condition. By determining the value of each pixel in the data region based on the imaging signal, the individual information is read. The read individual information is stored to a predetermined memory. In this way, the individual information can be obtained from the solid-state image sensor built into an imaging device, and set to the imaging device.

20 Claims, 4 Drawing Sheets

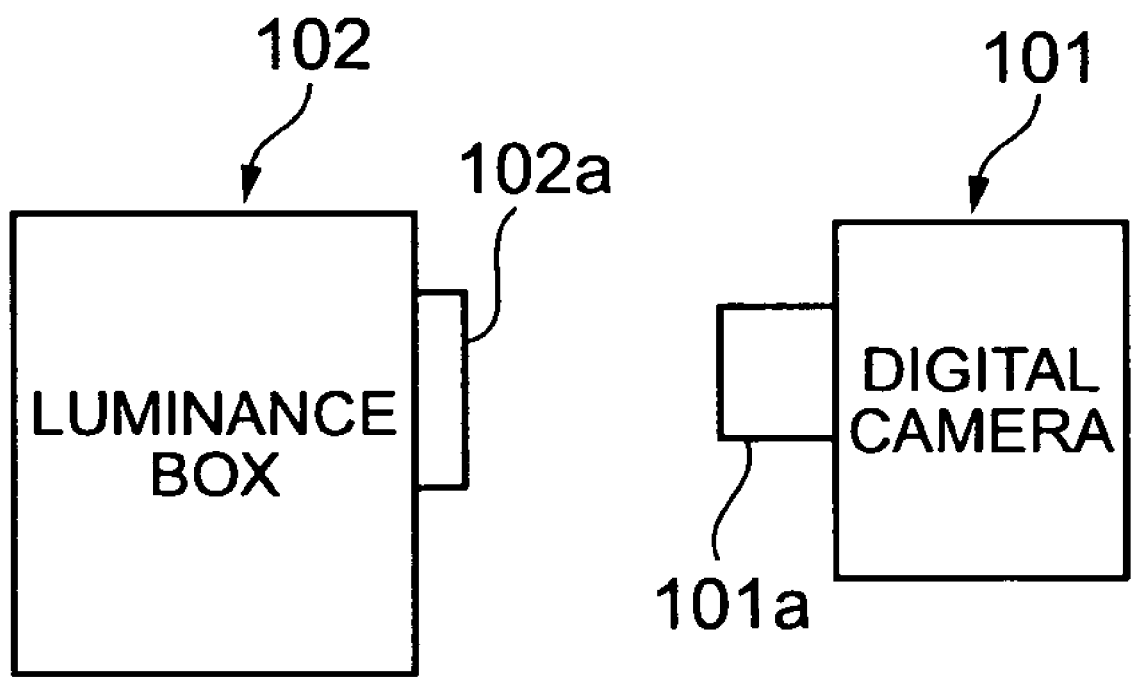

METHOD FOR SETTING INDIVIDUAL INFORMATION OF SOLID-STATE IMAGE SENSOR, SOLID-STATE IMAGE SENSOR, AND IMAGING DEVICE

BACKGROUND OF THE INVENTION

1. Field of the Invention

The present invention relates to a method for setting individual information of solid-state image sensor, solid-state image sensor, and imaging device suitable for a digital camera.

2. Description of the Related Art

Conventionally, in an imaging device such as a digital camera, etc., a CCD (Charge Coupled Device) is generally used as a solid-state image sensor. To adequately function the CCD of the imaging device, various setting parameters are necessary. Various setting parameters are generally pre-stored to a predetermined memory in a digital camera, etc. When the digital camera, etc., is operating, the setting parameters are read from the memory. Activation of the CCD and various signal processing are performed based on the read setting parameters. This kind of imaging device is disclosed in for example, Unexamined Japanese Patent Application KOKAI Publication No. 2003-46871.

The above described setting parameter includes common information and individual information. Common information is information which differs according to the type of the CCD, i.e., information that is common among the same types of CCDs. Individual information is information which differs according to each CCD, i.e., information that is unique to each CCD. Concretely, individual information indicates for example, flaw defects, sensitivity of RGB (Red, Green, Blue), and substrate voltage (or the adjustment data thereof). Conventionally, because an average DC bias is generated in the CCD, it is not necessary to provide an adjustment voltage to each CCD, externally. Recently, the number of pixels of the CCD is increasing, and the size of the CCD is becoming smaller. Namely, the size of 1 pixel is becoming smaller. Therefore, there is not enough voltage generated in the CCD, and it is necessary to provide an adjustment voltage individually.

Of the aforementioned individual information, information concerning flaw defects and sensitivity of RGB can be obtained relatively in a short time and easily, even if the CCD is in a state where it is built into the product. For example, information concerning flaw defects can be obtained in about several dozen seconds to one minute. On the other hand, it is hard to obtain the adequate value of the substrate voltage, unless it is before the CCD is built into the product, and it takes a lot of time to obtain it. Therefore, ordinarily, a serial number is printed to the surface of the CCD (generally, to the back side surface), at the manufacturing time of the CCD. Data of the substrate voltage that corresponds to each serial number is provided to the manufacturing factory of a digital camera, etc., in a state where the data is stored in a recording medium, or in the form of a document. The provided data is written into the above described predetermined memory of each product, at the time when the CCD is built into the product, in the manufacturing factory.

However, in a case where the individual information of the CCD is stored to a digital camera, etc. and used as above, there are problems in that it takes time to store the setting parameter, and a cost occurs to manage the setting parameter. Especially, when storing data of the above described substrate voltage, there is a possibility of an input mistake occurring. Furthermore, when re-adjusting the substrate and product that the CCD is built in, there is a problem that the serial number can not be confirmed without dismantling the substrate and product.

The content of the above document, is incorporate herein by reference in their entirety.

SUMMARY OF THE INVENTION

A preferred mode of the present invention is an individual information setting method of a solid-state image sensor, which is a method for setting individual information unique to a solid-state image sensor, to an imaging device that comprises the solid-state image sensor that has a photosensitive surface where an optical image of a photographic subject is formed, converts the optical image formed on the photosensitive surface to an electric charge, and outputs the electric charge as an image signal, comprising:

storing the individual information in advance, so that it can be output as an imaging signal, to a non-effective pixel region, which is not used in generating an image on the photosensitive surface of the solid-state image sensor;

obtaining the individual information included in the imaging signal output from the solid-state image sensor, by driving the solid-state image sensor, and storing the obtained individual information to a predetermined recording medium that the imaging device comprises, thereby setting the individual information.

Another preferable mode of the present invention, is a solid-state image sensor, which comprises a photosensitive surface where an optical image of a photographic subject is formed, and an output unit which converts the optical image formed on the photosensitive surface to an electric charge, and outputs the electric charge as an imaging signal, wherein:

the photosensitive surface includes a non-effective pixel region that is not used in generating an image on the photosensitive surface, and the non-effective pixel region comprises a storing region for storing individual information unique to the solid-state image sensor, so that the individual information can be output as an image signal.

Another preferable mode of the present invention is an imaging device that comprises a solid-state image sensor, and is constituted by:

a memory for storing an individual information that is unique to the solid-state image sensor;

an individual information obtaining unit which drives the solid-state image sensor, and obtains individual information included in an imaging signal that is output from the solid-state image sensor, and a control unit which stores the individual information obtained by the individual information obtaining unit, to the memory.

BRIEF DESCRIPTION OF THE DRAWINGS

This object and other objects and advantages of the present invention will become more apparent upon reading of the following detailed description and the accompanying drawings in which:

FIG. 4 is a diagram showing a form of the initial setting operation of the digital camera, carried out in the factory.

DETAILED DESCRIPTION OF THE PREFERRED EMBODIMENT

Figure 1:
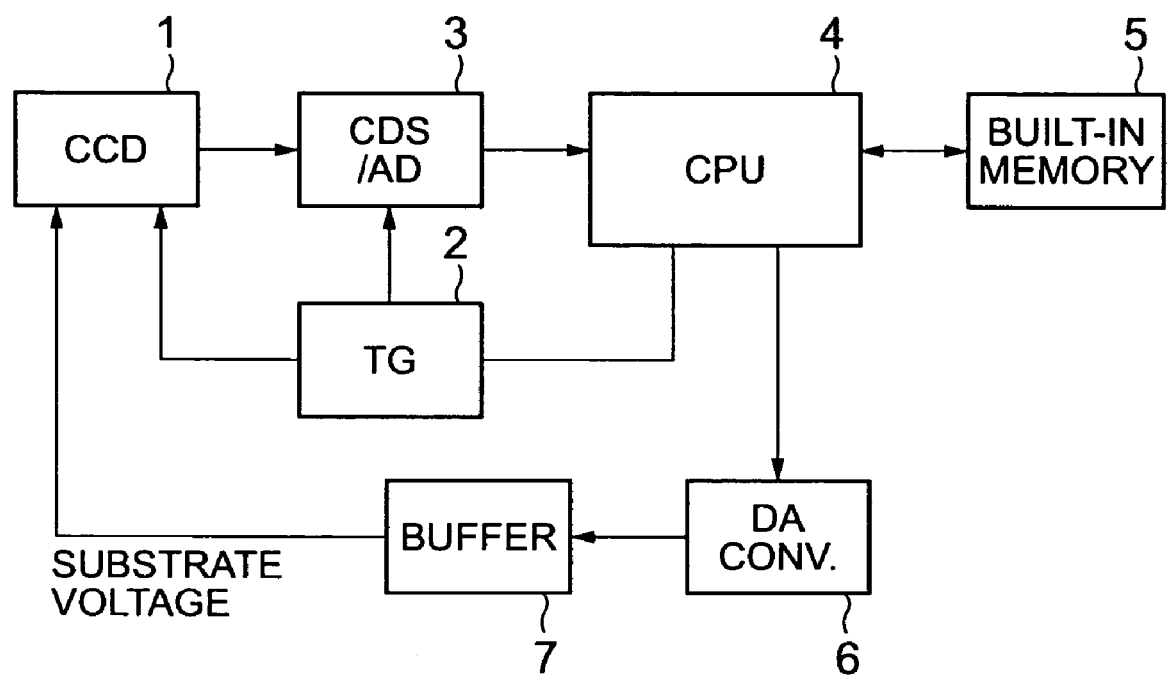
FIG. 1 is schematic block diagram showing main parts of a digital camera, according to an embodiment of the present invention.

Below, an embodiment of the present invention will be described with reference to the drawings. FIG. 1 is a schematic block diagram showing main parts of a digital camera according to the embodiment of the present invention.

The digital camera comprises a CCD 1 that is a solid-state image sensor. An optical image of a photographic subject is formed on a photosensitive surface of the CCD 1, by a not-shown optical system. The CCD 1 is driven by a TG (Timing Generator) 2. The CCD 1 outputs an imaging signal of a level in accordance with the amount of electric charge stored in each pixel that structures the CCD, to an analog processing unit 3. The analog processing unit 3 includes an AGC (Auto Gain Control) amplifier, a CDS (Correlated Double Sampling) circuit, and an AD converter. The analog processing unit 3 adjusts the gain of the input imaging signal. Also, the analog processing unit 3 carries out sampling of the input imaging signal, using a signal synchronous with the timing from the TG 2. Then, the analog processing unit 3 converts the imaging signal that is carried out sampling to digital data having a predetermined number of bits, and outputs it to a CPU 4, as imaging data.

The CPU 4 controls operation of the digital camera, including compressing of image data, based on various control programs stored in a built-in memory 5. By performing various signal processing to the supplied imaging data, the CPU 4 converts the supplied imaging data to respective image data of RGB (Red, Green, Blue). Further, the CPU 4 converts the image data to video signals. Then, the CPU 4 displays a through image to a not-shown monitor based on the video signals, and compresses the video signals in response to releasing the shutter, in accordance with a predetermined format, such as JPEG (Joint Photographic Experts Group), etc., to store in a not-shown memory for image storing.

The built-in memory 5 is a flash memory, etc. in which data can be written in, in accordance with need, and which can retain the data that is written in. Other than the above control program, the built-in memory 5 stores data used in operation such as, AE (Automatic Exposure) and AWB (Auto White Balance), etc., and setting parameters for adequately functioning the CCD 1. As described in the Description of the Related Art, the setting parameters include common information which is common between the CCD 1 of the same type, and individual information unique to each CCD 1. The CPU 4 controls operation of the CCD 1, based on the setting parameters. At this time, by controlling a DA converter 6 based on setting information of a substrate voltage stored as the setting parameter, the CPU 4 sets the substrate voltage supplied from a not-shown power supply circuit to the CCD 1, to an adequate value. A buffer 7 for adjusting impedance is provided between the DA converter 6 and the CCD 1. In the present embodiment, the setting information is the value of the substrate voltage. However, setting information may be other information, such as the difference, etc., between the substrate voltage and a predetermined standard voltage.

Figure 2A:
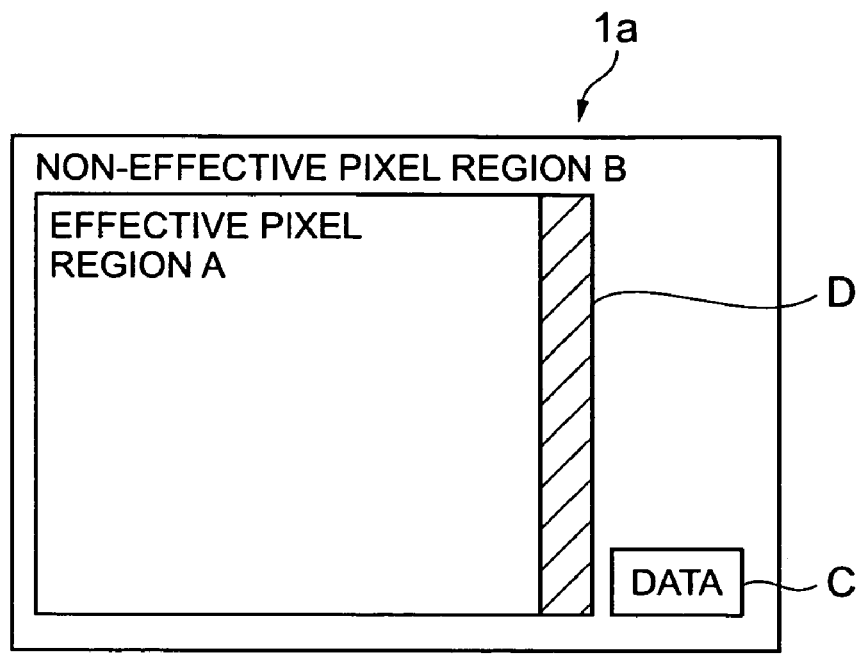
FIG. 2A is a diagram showing a structure of a CCD that the digital camera according to the embodiment of the present invention has, and is a diagram indicating a pixel region of a photosensitive surface.
Figure 2B:
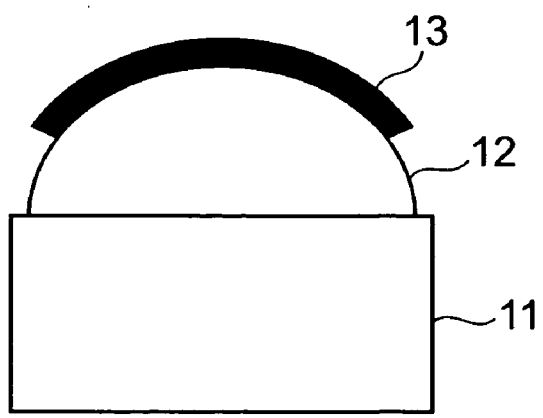
FIG. 2B is a diagram showing a structure of a CCD that the digital camera according to the embodiment of the present invention has, and is a cross-sectional view of a photosensitive portion.

On the other hand, the CCD 1 has a structure shown in FIGS. 2A and 2B. FIG. 2A is a diagram showing a pixel region that a photosensitive surface 1a of the CCD 1 comprises. FIG. 2B is a cross-sectional view showing a structure of a photosensitive portion that the CCD 1 has. The pixel region of the photosensitive surface 1a is constituted by an effective pixel region A and a non-effective pixel region B. The effective pixel region A and the non-effective pixel region B are each constituted by a plurality of pixels (pixel portions), and a photo diode 11 (refer to FIG. 2B) is placed in each pixel portion. A signal generated by photoelectric conversion of each photo diode 11 included in the effective pixel region A and the non-effective pixel region B, is output from the CCD 1 to the analog processing unit 3, as an imaging signal. The imaging signal obtained from the effective pixel region A is converted to image data, and used for generating a photographed image. On the other hand, the imaging signal obtained from the non-effective pixel region B, ultimately is not used in generating the photographed image. This structure is the same as the structure of a general CCD. Ordinarily, a light shielding region D is provided to the non-effective pixel region B, so that it contacts the effective pixel region A.

In the CCD 1 of the present embodiment, setting information of the above mentioned substrate voltage is stored to the non-effective pixel region B, excluding the light shielding region D, by the below method. Concretely, a data region C constituted by a plurality of pixel portions is provided in the non-effective pixel region B. In predetermined pixel portions in the data region C, as shown in FIG. 2B, a black coating film 13 is selectively formed to the surface of the micro lens 12 for collecting light, which covers the photo diode 11. By this, photosensitivity that a predetermined pixel portion in the data region C has, is invalidated. The pixel portions whose photosensitivity is invalidated, is recognized as "0", and other pixel portions in the data region C, besides those pixel portions, are recognized as "1" (details will be later described). By this, digital information of a predetermined bit length (for example, 4 bits to 8 bits) indicating the setting information, is structured by the plurality of pixel portions in the data region C. Storage of the setting information, namely, forming of the coating film 13 is carried out or example, in a condition of a wafer, at the manufacturing time of the CCD 1.

In a digital camera that has the above structure, setting information of the substrate voltage is stored in the CCD 1, by the above described method. The stored setting information is a setting parameter directly used by the CPU 4 to control operation of the CCD 1. In the manufacturing process of the digital camera (product), the setting parameter is stored in the built-in memory 5, by the below initial setting operation being carried out in a state where the CCD 1 is built into the product.

Figure 3:
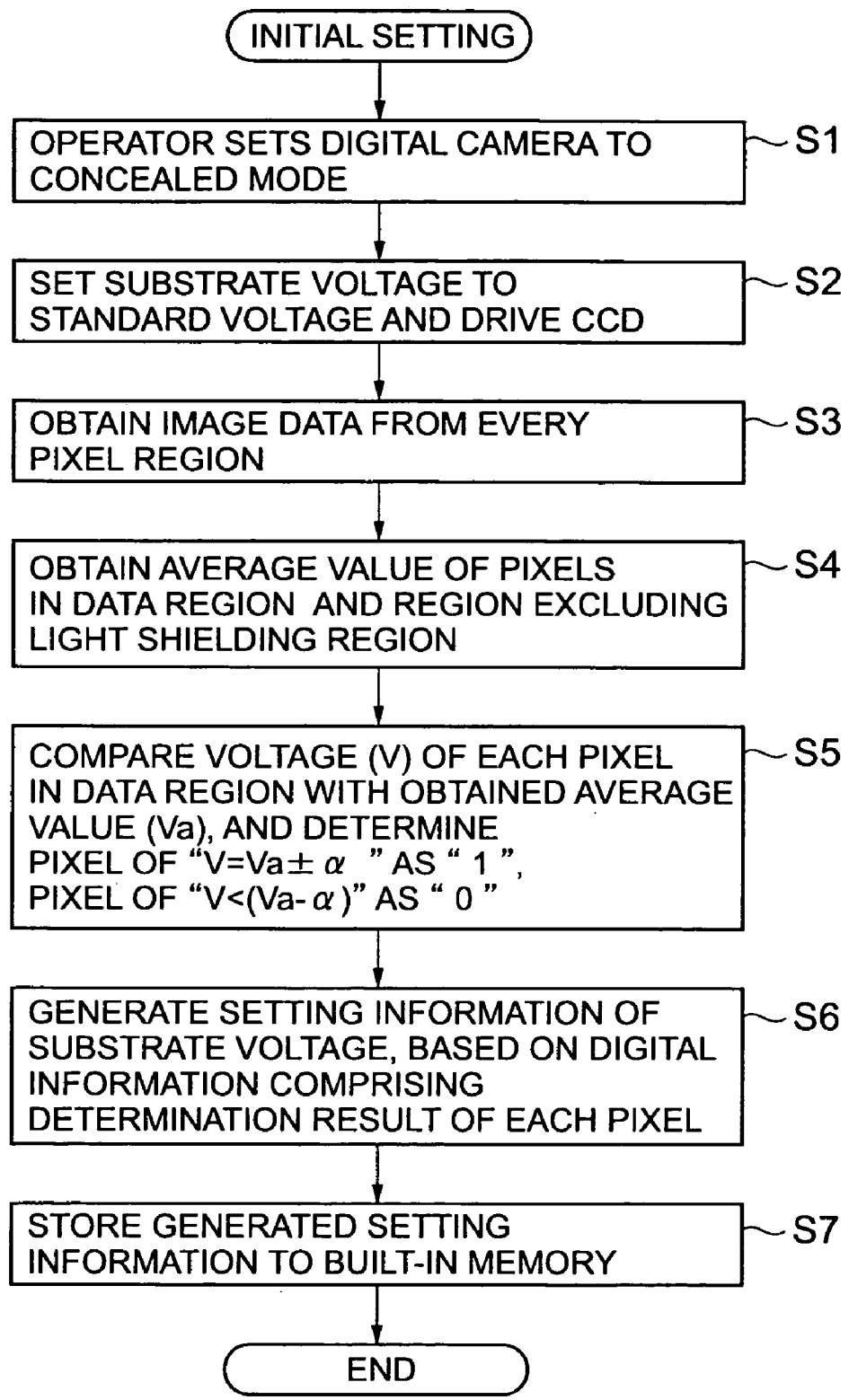
FIG. 3 is a flowchart showing procedures of an initial setting operation of the digital camera according to the embodiment of the present invention, carried out in a factory.

FIG. 3 is a flowchart showing procedures for storing the setting parameter to the built-in memory 5. First, as shown in FIG. 4, the operator prepares a luminance box 102 that comprises a photographic subject unit 102a for providing a photographic subject that as a uniform brightness. Then, the operator arranges a lens 101a of the product (digital camera) 101 towards the photographic subject unit 102a. Next, in this state, the operator sets the product 101 to a concealed mode, which is provided in the product 101 to carry out initial setting in the factory (step S1). In response to the operating setting the product to the concealed mode, the CPU 4 drives the CCD 1, while controlling the substrate voltage to a standard voltage in accordance with the type of the CCD 1 (step S2). Then, the CPU 4 obtains image data based on an imaging signal gained from the whole pixel region (effective pixel region A and non-effective pixel region B) of the CCD 1 (step S3). By this, the CPU 4 can obtain more image data than the image data that can e ordinarily obtained by the-digital camera 101 that is shipped as a product. For example, the maximum image data that is ordinarily obtained, has a size of, 1,600 pixels×1,200 pixels, etc. In this case, image data obtained in the concealed mode, has a size of 1,600+n pixels×1,200+n pixels. Next, the average value of the voltage of pixels (luminance information) in the region excluding the data region C and the light shielding region D is obtained (step S4). The CPU 4 compares the value of the voltage of each pixel in the data region C with the obtained average value. If the value of the voltage of each pixel is the same as the obtained average value, namely, if the value of the voltage of each pixel is in a predetermined range from the obtained average value, the CPU 4 determines the voltage of each pixel as "1". In a case where the value of the voltage of each pixel is a lower voltage, which is out of a predetermined range from the obtained average value, the CPU 4 determines the voltage of each pixel as "0" (step S5). In this way, the CPU 4 determines the voltage of each pixel in the data region C as data of 1 bit. Digital information which includes determination results of every pixel in the data region C, indicates a substrate voltage provided as individual information of the CCD 1. Based on the determination results of every pixel in the data region C, the CPU 4 generates setting information of the substrate voltage as the above mentioned setting parameter (step S6). In the present embodiment, the setting information indicates the setting value of the substrate voltage. Then, the CPU 4 stores the generated setting information to the built-in memory 5 (step S7).

In the present embodiment, when manufacturing the digital camera, a value of the substrate voltage that is unique to the CCD 1 is stored as the setting information in the CCD 1. At this time, an unbreakable relationship between the setting information (setting data) and the CCD 1 is assured, and artificial errors can be surely excluded from the setting information. Therefore, setting of the substrate voltage can be carried out easily and unmistakably. Furthermore, in a case where some sort of trouble occurs in the imaging system, etc., at the time of the final test before shipping the product, and it becomes necessary to re-set the above substrate voltage, the re-setting operation can be carried out easily and unmistakably.

In the above description, a case where the setting information of the substrate voltage is read from the CCD 1 and stored to the built-in memory 5, after assembling of the product is completed, is described. However, as long as the CPU 4 can perform the above described setting processing, setting information can be stored to the built-in memory 5 at any time.

Also, in the above description, a case where the CCD 1 carries out imaging to the photographic subject that has a uniform brightness, using the luminance box 102, to read the setting information of the substrate voltage from the CCD 1, is described. However, the CCD 1 can carry out imaging to another photographic subject, as long as setting information (digital information) stored in the CCD 1 can be determined based on the imaging signal output from the CCD 1.

In the present embodiment, a case where only the setting information of the substrate voltage is stored to the CCD 1 is described. However, other individual information unique to the CCD 1, for example, information of fault defect and sensitivity of each RGB, etc., may be stored to the CCD 1 by the same method as the substrate voltage, and stored to the built-in memory 5 (set to the digital camera) by the same method.

In the present embodiment, a case where the setting information of the substrate voltage is stored to the CCD 1, by invalidating photosensitivity that a predetermined pixel portion in the data region C has, is described. However, as long as it is possible to identify predetermined pixel portions and pixel portions other than the predetermined pixel portions, based on the imaging signal output from the CCD 1, photosensitivity can be left to a certain extent, without completely invalidating the photosensitivity of the predetermined pixel portions. Namely, the setting information of the substrate voltage does not have to be stored to the CCD 1 as complete digital information of "0" or "1". However, in this case, it is necessary for the imaging signal output from the CCD 1 to be recognized as digital information. Furthermore, setting information stored in the data region C may be indicated by data, which is not of two values of "0" and "1", but data equal to or more than three values. In this case, to indicate values other than "0" and "1" (for example "1.5", etc.), the photosensitivity that the predetermined pixel portions have, may be controlled to multi-steps (for example, three steps, etc.).

In the above, to invalidate the photosensitivity that the predetermined pixel portions have, the coating film 13 is formed on the surface of the micro lens 12, which is at the predetermined pixel portions. However, the material and coating method of the coating film 13 can be arbitrarily selected in accordance with the material of the micro lens 12. The photosensitivity that the predetermined pixel portions have, may be controlled by a method other than coating. For example, the photosensitivity may be controlled by forming a light shielding film to the front side surface or back side surface of the micro lens 12. By the same method as the light shielding method of the light shielding region D, the photosensitivity may be invalidated. Further, as another embodiment, a processing for losing the photosensitivity of the elements themselves, in the predetermined portions can be carried out. For example, after manufacturing or during the manufacturing process of the CCD 1, a laser light is irradiated to the photo diode 11 of predetermined portions, and the photo diode 11 may be destroyed by the heat.

In the above embodiment, each predetermined pixel portion in the data region C, expresses digital information of "0" or "1". However, by the present manufacturing method of the CCD 1, a flaw defect inevitably exists in whichever pixel portion. There is a case where this flaw defect exits in a predetermined pixel portion in the data region C. Therefore, when storing individual information of the CCD 1 to the data region C, it is preferable to adopt a data structure where some kind of error correction of stored data can be carried out.

As a data structure in which an error correction can be carried out, for example, there is a data structure which is realized by dividing the data region C into blocks of 3×3 pixels, and expressing the pixels as "0" or "1" in units of blocks. In this case, the value of each block ("0" or "1") may be determined by the average value of the value (voltage) of 9 pixels. Or, each value ("0" or "1") of the nine pixels included in each block may be individually determined, and the value of each block may be decided by the majority. By doing so, errors occurring from defects existing in the data region C can be eliminated.

Other than the above, by storing same setting information to odd number of places equal to or more than three, the data structure of the stored setting information may have redundancy. In this case, the same setting information is read from a plurality of places in the data region C. Then, by the majority, the adopted setting information is determined. By doing so, errors occurring from defects existing in the data region C can be eliminated.

In the present embodiment, a case where the present invention is applied to a digital camera is described. However, the present invention can be applied to other imaging devices, such as a digital video camera, or a camera unit, etc., that are built-in or externally attached to a cellular phone or a PDA. In the present embodiment, a case where the present invention is applied- to a CCD 1 is described. However, it is not limited to this, and the present invention can be applied to other solid-state image sensors, etc., of an MOS type, as long as it comprises a non-effective pixel region that is not used in generating the photographed image.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment.

Various modifications made within the meaning of an equivalent of the claims of the invention and within the claims are to be regarded to be in the scope of the present invention.

This application is based on Japanese Patent Application No. 2003-183674, filed on Jun. 27, 2003, and including specification, claims, drawings and summary. The disclosure of the above Japanese Patent Application is incorporated herein with reference in its entirety.

What is claimed is:

1. A method for setting individual information that is unique to a solid-state image sensor to an imaging device that comprises the solid-state image sensor, wherein the solid-state image sensor has a photosensitive surface on which an optical image of a photographic subject is formed, and the solid-state image sensor converts the optical image to an electric charge and outputs the electric charge as an image signal, the method comprising:
   storing the individual information in advance to a non-effective pixel region, which is not used in generating an image, on the photosensitive surface of the solid-state image sensor such that the stored individual information can be output as an image signal;
   activating the solid-state image sensor;
   calculating a predetermined threshold value based on: (i) an image signal output from an effective pixel region, which is used in generating an image, on the photosensitive surface of the solid-state image sensor, and (ii) an image signal output from the non-effective pixel region;
   obtaining the individual information stored to the non-effective pixel region by comparing the image signal output from the non-effective pixel region with the calculated threshold value; and
   storing the obtained individual information to a predetermined recording medium of the imaging device, thereby setting the individual information to the imaging device.

2. The method according to claim 1, wherein the individual information output from the solid-state image sensor is stored on the recording medium as digital data.

3. The method according to claim 1, wherein the solid-state image sensor includes a plurality of pixel portions, and a part of the individual information output from each of the plurality of pixel portions to which the individual information is stored is used as digital data of 1 bit.

4. The method according to claim 1, wherein the non-effective pixel region comprises a plurality of pixel portions, and the individual information is stored in the non-effective pixel region by individually controlling photosensitivities of pixel portions in the plurality of pixel portions in the non-effective pixel region.

5. The method according to claim 4, wherein the photosensitivies of the plurality of pixel portions are controlled by providing light shielding to desired ones of the plurality of pixel portions.

6. The method according to claim 4, wherein the photosensitivies of the plurality of pixel portions are controlled by invalidating the photosensitivities of desired ones of the plurality of pixel portions.

7. The method according to claim 4, wherein the individual information in the non-effective pixel region has a data structure in which error correction is possible.

8. The individual information setting method of a solid-state image sensor according to claim 1, wherein the individual information is stored in a storage region in the non-effective pixel region, and the storage region is adjacent to the effective pixel region with a light shielding region that shields the optical image interposed between the storage region and the effective pixel region.

9. A solid-state image sensor system which converts an optical image formed on a photosensitive surface thereof to an electric charge and outputs the electric charge as an image signal, the solid-state image sensor system comprising:
   a storage region which: (i) is provided in a non-effective pixel region, which is not used in image generation, on the photosensitive surface, and (ii) outputs individual information unique to the solid-state image sensor as an image signal; and
   an individual information obtaining unit which calculates a predetermined threshold value based on: (i) an image signal output from an effective pixel region, which is used in image generation, on the photo sensitive surface, and (ii) an image signal output from the non-effective pixel region, and which obtains the individual information based on a result of a comparison of the calculated threshold value with the image signal output from the storage region.

10. The solid-state image sensor system according to claim 9, wherein the non-effective pixel region comprises a plurality of pixel portions, and the individual information is stored in the non-effective pixel region by individually controlling photosensitivities of pixel portions in the plurality of pixel portions in the non-effective pixel region.

11. The solid-state image sensor system according to claim 10, wherein the photosensitivies of the plurality of pixel portions are controlled by providing light shielding to desired ones of the plurality of pixel portions.

12. The solid-state image sensor system according to claim 10, wherein the photosensitivies of the plurality of pixel portions are controlled by invalidating the photosensitivities of desired ones of the plurality of pixel portions.

13. The solid-state image sensor system according to claim 10, wherein the individual information in the non-effective pixel region has a data structure in which error correction is possible.

14. The solid-state image sensor system according to claim 9, wherein the individual information obtained by the individual information obtaining unit is stored on a recording medium as digital data.

15. An imaging device including a solid-state image sensor that converts an optical image formed on a photosensitive surface thereof to an electric charge, outputs the electric charge as an image signal, the imaging device comprising:
  an individual information obtaining unit which activates the solid-state image sensor, calculates a predetermined threshold value based on an image signal output from an effective pixel region, which is used in generating an image, on the photosensitive surface of the solid-state image sensor and an image signal output from a non-effective pixel region, which is not used in generating an image, and obtains individual information unique to the solid-state image sensor based on a result of a comparison of the calculated threshold value with the image signal output from the storage region; and
  a control unit which controls a memory section to store the individual information obtained by the individual information obtaining unit.

16. the imaging device according to claim 15, wherein the individual information is stored in the non-effective pixel region.

17. The imaging device according to claim 15, wherein the non-effective pixel region comprises a plurality of pixel portions, and the individual information is stored in the non-effective pixel region by individually controlling photosensitivities of pixel portions in the plurality of pixel portions in the non-effective pixel region.

18. The imaging device according to claim 17, wherein the photosensitivies of the plurality of pixel portions are controlled by providing a light shielding to desired ones of the plurality of pixel portions.

19. The imaging device according to claim 17, wherein the photosensitivies of the plurality of pixel portions are controlled by invalidating the photosensitivities of desired ones of the plurality of pixel portions.

20. The imaging device according to claim 17, wherein the individual information in the non-effective pixel region has a data structure in which error correction is possible.

* * * * *